C. HAMBUECHEN.
TAMPING MACHINE.
APPLICATION FILED APR. 29, 1916.
1,232,297.
Patented July 3, 1917.
2 SHEETS—SHEET 2.
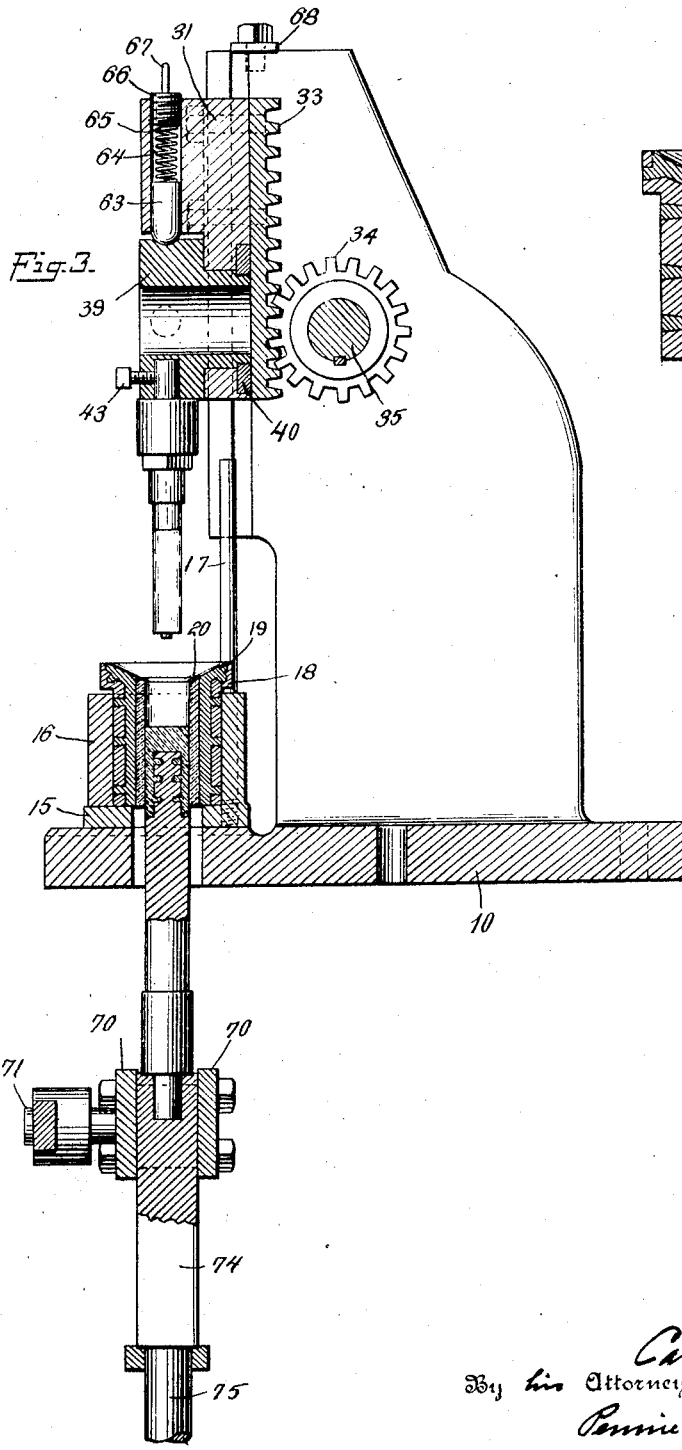
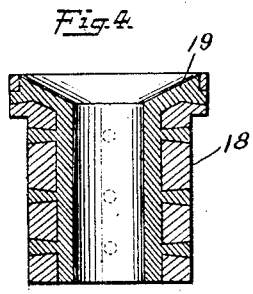
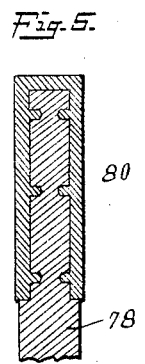
Inventor
Carl Hambuechen
By his Attorneys
Pennie Davis & Marvin

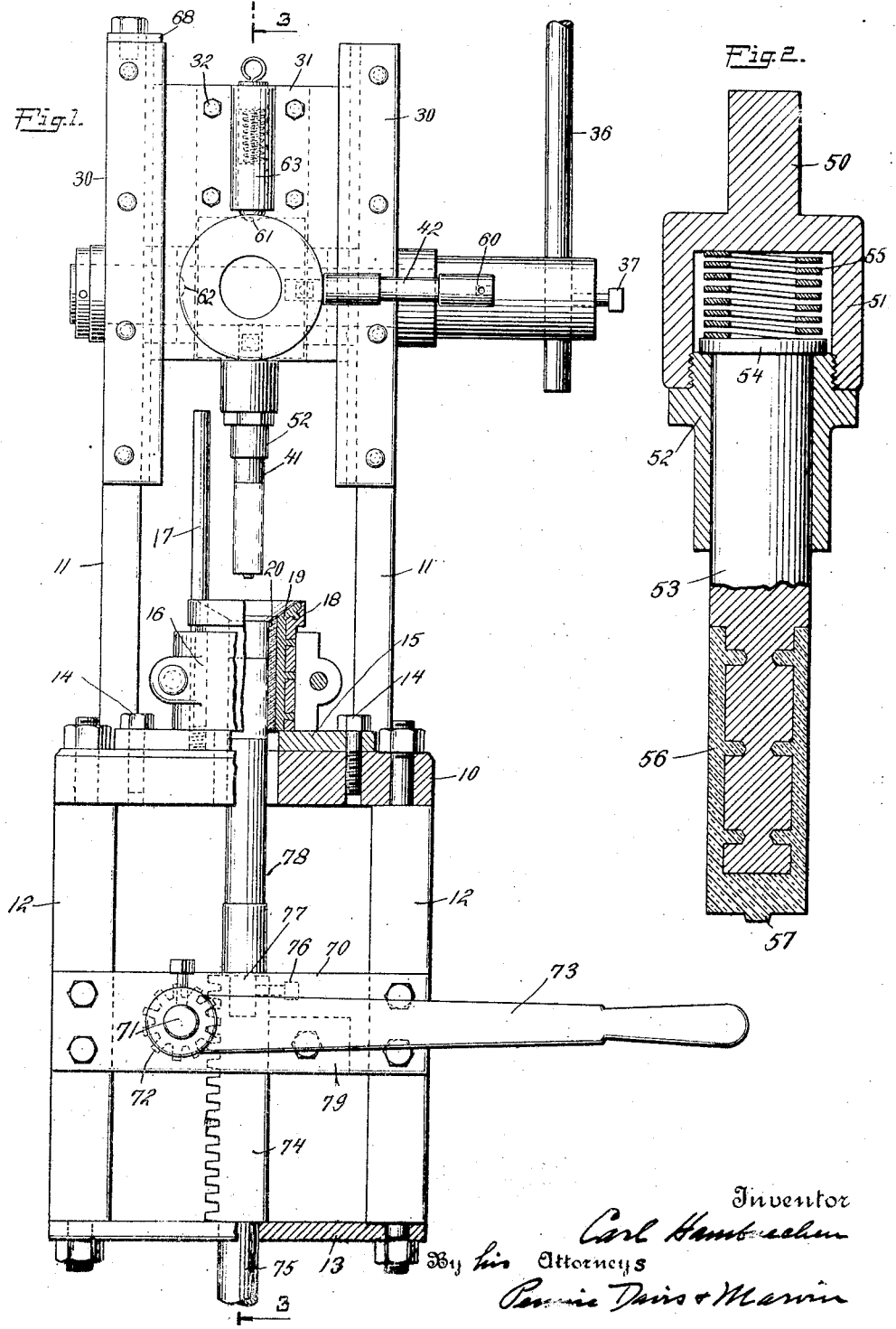

UNITED STATES PATENT OFFICE.

CARL HAMBUECHEN, OF BELLEVILLE, ILLINOIS, ASSIGNOR TO C. F. BURGESS LABORATORIES, OF MADISON, WISCONSIN, A CORPORATION OF WISCONSIN.

TAMPING-MACHINE.

1,232,297.  Specification of Letters Patent.  Patented July 3, 1917.

Application filed April 29, 1916. Serial No. 94,303.

*To all whom it may concern:*

Be it known that I, CARL HAMBUECHEN, a citizen of the United States, residing at Belleville, county of St. Clair, State of Illinois, have invented certain new and useful Improvements in Tamping-Machines; and I do hereby declare the following to be a full, clear, and exact description of the invention, such as will enable others skilled in the art to which it appertains to make and use the same.

In the manufacture of Le Clanche batteries of the type commonly designated as dry cells, it is customary to compound a mixture of manganese dioxid and carbonaceous material, such as graphite or carbon or a mixture of the two, and to wet this mixture with a solution of ammonium chlorid and zinc chlorid until the mixture becomes somewhat coherent, about like moist earth. This material, commonly designated as battery "mix," is compressed or tamped about the carbon rod of the battery, and subsequently serves as a depolarizer, as is well understood in the battery art. The material is somewhat difficult to handle, for not only is it corrosive, but it tends to dry out and become lumpy. If tamped about the carbon rod under too light pressure, the granules composing the mass will not be in satisfactory electrical contact, and if tamped in position under too heavy pressure, there will not be sufficient room for electrolyte within the pores of the mass.

It is an object of the present invention to provide a tamping machine wherein this material known as battery mix may be quickly and economically assembled in a coherent mass enveloping a carbon rod, this mass being neither too dense nor too porous, and of substantially uniform density throughout and well adapted for its intended use.

The preferred embodiment, disclosed more in detail hereinafter, is well adapted to resist the corrosive tendency of the mix and is so constructed as to expeditiously mold the mix under pressure, and then insert in the molded body a carbon rod adapted to serve as a core. The machine comprises a revolving turret whereon the tamping tool and the rod-placing tool are mounted, together with means for raising and lowering the turret when these tools are in action. The machine also comprises an ejector for removing the finished product from the mold, and the entire apparatus is so constructed and the elements thereof are so related to one another, as to form a machine in which the various operations may be conveniently and quickly performed and by unskilled labor.

Other objects and advantages will be made clear by the following detailed description.

In the accompanying drawings forming a part of this specification,

Figure 1 is a front elevation showing the general arrangement of all parts of the apparatus with a portion thereof in section;

Fig. 2 is a view chiefly in section of a form of tamping tool that may be used in the machine;

Fig. 3 is a side elevation in section, taken along the line 3—3 of Fig. 1;

Fig. 4 is a view in section of a modified form of a mold;

Fig. 5 is a view in section of the upper end of one form of ejector; and

Fig. 6 is a view partly in section of another form of tamping tool.

In the drawing, similar reference characters denote similar parts throughout the several views thereof.

The machine consists of a base 10 adapted to be attached to a bench or any other means of support. Extending upwardly from the base is a framework composed of two bracket members 11—11 which serve as a support for the upper movable parts of the machine. Attached to the base 10 are two depending members 12—12 which serve as supports for the ejector portion of the machine. The lower ends of 12—12 may be connected by a cross-piece 13 which serves as a brace for these members as well as a bearing for another part of the apparatus.

Mounted upon the base of the machine and attached thereto by screws 14 is a jig 15 with a removable front 16 which serves to grip and hold the mold within which the electrode is formed. Also, threaded into the base of the jig is a vertical rod 17 which acts as a stop for the upper movable part of the apparatus as will hereinafter appear.

Fig. 1 shows partly in section the construction of one form of mold. In this particular embodiment it is shown as composed of an outer casing 18 preferably of cast iron, on the inside of which is attached, by means of integral lugs, a lining 19 of Babbitt metal or any other metal which will not be acted upon appreciably by the chemicals contained in the active and corrosive material of the electrode. Fig. 1 shows an inner lining 20 which may be composed of glass or porcelain. While the last named lining is preferred, it is not necessary to successful operation, and as shown in Fig. 4, the mold may be formed with simply the lining of Babbitt metal. The upper end of the mold is formed funnel-shaped in order that the mixture may be fed in more easily. The molds for use on any one machine are preferably all turned to one external diameter to fit into the jig 15, by which arrangement one machine will serve the purpose of forming electrodes of various sizes.

At the upper part of the machine, 30—30 represent guides attached to the front faces of the uprights 11—11 of the framework. Within the guides is slidably mounted a head indicated collectively by 31. Attached to the rear of the head by bolts 32 is a rack 33 adapted to be engaged by a pinion 34 on a shaft 35 mounted in suitable bearings in the frame members 11—11. Upon one end of the shaft 35 is mounted a handle 36 by which the shaft may be rotated to elevate or depress the head. The leverage of the handle on the shaft 35 may be altered by means of the set screw 37.

Mounted in an aperture in the movable head 31 is a rotatable turret 39 having an extension passing through the aperture, and a nut 40 screwed to the rear end of the extension in order to retain the turret in place on the head.

At two points in the turret, preferably 90° apart, are drilled two sockets adapted to receive the tamping tool 41 and the carbon-placing tool 42. These tools are formed to fit within the sockets and are held therein by suitable set screws 43.

The tamping tool 41 may be formed as shown in Fig. 6, or it may be of the construction shown in Fig. 2. In the former figure it comprises a shank 44 adapted to fit in the socket of the turret, a portion 45 forming a shoulder to engage the outer surface of the turret, and a main portion 46 carrying at its lower end a casing 47 of Babbitt metal or any other material not affected by the active material of the electrode. As explained in connection with the mold, glass or porcelain may be used in addition to the Babbitt metal or in place thereof. The casing 47 is formed with a small projection 48, the purpose of which will hereinafter appear.

Referring now to the form of tamping tool shown in Fig. 2, there is a shank 50 adapted to fit within the socket of the turret. This shank is formed with a socket extension 51, and the outer end of the inside of the socket is screw-threaded to receive a member 52 which serves as a bearing for the main rod 53 of the tool. The upper end of 53 is formed with a shoulder 54 to retain the rod 53 in place within the bearing 52. Between the upper surface of 53 and the inner end of socket 51 is a flat spring 55. The bearing member 52 is formed near its upper portion in the form of a hexagon in order that it may be screwed into the socket 51. The lower end of the plunger 53 is provided with a casing 56 of Babbitt metal, glass, porcelain or any other non-corrosive material, and there is at the bottom of the casing a projection 57 similar to 48 of Fig. 6.

The carbon-placing tool 42 is formed with a shank similar to the shank of the tamping tool and for the same purpose. The main portion of the carbon-placing tool may be formed of any convenient shape and preferably there is drilled within the outer end thereof a hole 60 for a purpose which will appear when the operation of the machine is described.

The turret 39 may be rotated so that either the tamping tool 41 or the carbon-placing tool 42 is in operative position. In order to insure that these tools shall remain in this position while the machine is being operated, two depressions 61 and 62 are provided diametrically opposite the tamping and carbon-forming tools respectively. A steel pin 63 is placed within a hole 64 drilled through the upper portion of the movable head 31. The pin is held against the surface of the turret or forced into the depressions therein by a spring 65, the tension of which may be adjusted by the set screw 66 in the upper end of hole 64. A ring 67 may be attached to the adjusting screw or to any other part of the head to serve as a connection for a counterbalancing device such as a weight suspended from a chain moving over a pulley, the purpose of this arrangement being to hold normally the head in its upper position. In order that the head shall not, however, be withdrawn from the machine by the counterbalancing weight, a stop 68 may be attached to the top of one of the upright members 10 of the frame.

Considering now the parts of the mechanism mounted below the base, there is attached to the front and back of the members 12—12 a pair of cross-bars 70 which serve as bearings for a stub-shaft 71 upon which and between the members 70 is mounted a pinion 72. Upon the forward end of the stub-shaft is attached an operating lever 73.

The above described handle and pinion serve as a means for operating the device for ejecting the finished electrodes from the mold, which device will be referred to hereinafter simply as the ejector. The pinion 72 engages a rack-bar 74 having at its lower end a shaft 75 passing through a bearing in cross-piece 13. At the upper end of the rack-bar 74 is a socket within which is fastened by a set screw 76 a lug 77 formed at the bottom of the plunger 78 of the ejector. In order to insure the engagement of the teeth of rack-bar 74 with the teeth of pinion 72 a block 79 may be fastened between the members 70 in a position to hold the rack-bar in proper alinement with the remaining portions of the ejector. The top of the ejector is provided with a non-corrosive casing 80 as shown both in Fig. 3 and the detail view Fig. 5. As in the case of the lining of the mold and the casing upon the tamping tool, the ejector casing should be made of some non-corrosive material such as Babbitt metal, glass or porcelain, for instance. The diameter of the upper end of the ejector should be such as to fit closely, but with a sliding fit, within the aperture of the mold. While the electrode is being formed in the mold the top of the ejector serves as the bottom of the mold.

The operator sits directly in front of the machine which is mounted at such a height that the handle 73 is about opposite his knees. With the ejector in its lowest position which corresponds to the horizontal position of the handle 73, the bottom of rack-bar 74 rests upon cross-piece 13 and the top of the ejector will be within the mold and at a distance below the inner edge of the funnel-shaped end of the mold a distance equal to or greater than the length of the electrode which is to be formed in the machine. The operator places some of the active material into the mold on top of the ejector and compresses it by moving the tamping tool up and down by means of the handle 36, it being understood, of course, that in this operation the turret is set as shown in the drawings, namely, with the tamping tool 41 in operative position. The active material is added in small quantities and compressed to about one-half its usual density, the top thereof being finally brought about even with the bottom of the funnel of the mold. The projection 48 or 57, according to which form of tamping tool is used, will form a depression on the top of the core of active material.

It may here be noted that the use of the tamping tool shown in Fig. 2 prevents the operator from applying more than a certain pressure to compress the active material, for when this pressure is exceeded, the spring 55 will yield, causing the plunger 53 to remain in a relatively fixed position while the other parts of the tool 50 and 52 move with respect thereto. Experienced operators can gage the pressure by the resistance at handle 36, but with the tool of Fig. 2 less experience and judgment is required. The upright rod 17 acts as a stop to limit the downward movement of head 31 so that even if the form of tamping tool shown in Fig. 6 is used, the tool can not be lowered farther than the limit determined by the stop.

When the tamping operation is completed, the mold will be filled with active material having on its upper surface a depression formed by the projection at the bottom of the tamping tool. The operator now swings the turret so that the carbon-placing tool 42 comes into operative position. He then centers a carbon rod in the depression at the top of the active mixture and lowers head 31 by means of handle 36 until the upper end of the carbon rod passes into the recess 60 on the end of the carbon-placing tool. Guiding the carbon rod with his fingers, he gradually lowers the head 31, which results in forcing the pencil down into the active material. It is sometimes of advantage to point the rod at the end which enters the mixture in order to facilitate the above operation. The carbon rod is also usually provided with a metallic cap at its upper end which serves as a terminal of the finished battery. The recess 60 should therefore be large enough to receive this cap and may have a depth determined by the amount of the carbon rod that it is desired shall project above the surface of the molded mix. The bottom surface of the carbon placing tool 60 at the last part of its movement compresses the mixture around the carbon rod and levels the top of the core which is raised up during the operation of inserting the carbon. On account of the head 31 coming in contact with the stop 17, the downward motion of the carbon-placing tool is stopped at a point when the carbon has penetrated the mixture sufficiently. By attaching the rod 17 to the base in an adjustable manner and providing tools of various lengths and with depressions of different depths, any degree of adjustment of the apparatus may be obtained. The position of the mold within the jig 16 may also be altered, thereby giving another mode of adjustment.

After the carbon rod has been inserted within the active material head 31 is raised, and the turret rotated through about 45 degrees so that neither of the tools is above the mold. The handle 73 is then raised which causes upward travel of the ejector to lift the finished electrode out of the mold. The ejector is then lowered to normal position within the mold, and the turret is rotated to place the tamping tool in position for a subsequent operation.

The finished electrode as it comes from the mold as above described is strong enough to permit handling in the factory and can be wrapped with a bibulous material such as cheese-cloth and can be assembled as the negative electrode of a dry cell, as will be understood by those skilled in the art, or as disclosed, for instance, in Burgess Patent No. 1,162,449, dated November 30, 1915.

Although I have above described in detail one embodiment of various features of my invention, it will be understood that variations in detail may be made and that changes in construction and in the proportion and relation of the several parts may also be made without departing from the spirit of my invention as defined by the appended claims.

Having thus described my invention, what I claim as new and desire to secure by Letters Patent is:—

1. A tamping device for battery electrodes, comprising in combination, a mold, a movable member adjacent said mold, tool holding means mounted upon said member, a plurality of tools detachably secured to said means, mechanism for operating said movable member and thereby said tools, and means for ejecting the finished product from said mold.

2. A tamping device for battery electrodes, comprising in combination, a mold, means associated with said mold and normally serving as a base for said mold, means for actuating said first-named means whereby the product formed in said mold may be ejected therefrom, a movable member adjacent said mold, tool-holding means mounted upon said member, a plurality of tools detachably secured to said means, and mechanism for operating said movable member and thereby said tools.

3. A tamping device for battery electrodes, comprising in combination, a mold, a reciprocating member adjacent said mold, tool-holding means rotatably mounted upon said member, a plurality of tools detachably secured to said means, mechanism for operating said member and thereby said tools, means normally forming a bottom of said mold but adapted to reciprocate therein for ejecting the finished product from said mold, and means for operating said last-named means.

4. A device of the character described, comprising in combination a mold, a movable member adjacent said mold, means for limiting the travel of said movable member, tool-holding means rotatably mounted upon said member, a plurality of tools detachably secured to said means, and mechanism for operating said movable member and thereby said tools.

5. A device of the character described, comprising in combination, a frame, a mold, means for detachably securing said mold to said frame, a movable member adapted to reciprocate within said mold and normally forming the bottom of the mold, and means for actuating said reciprocating member whereby the latter serves as an ejector for material in said mold.

6. A tamping device for battery electrodes, comprising in combination, a tubular mold having a lining of non-corrosive material, a movable member adjacent said mold, a tamping tool mounted on said movable member, a casing of non-corrosive material about one end of said tool, an ejector associated with said mold and normally forming the bottom thereof, and a casing of non-corrosive material upon the end of said ejector forming the said bottom.

7. A machine of the class described, comprising in combination a movable member, means for actuating said member, a turret rotatably mounted upon said member, a plurality of sockets in said turret, a plurality of depressions on the periphery of said turret, a pin mounted on said member adapted to fit in said depressions, a spring for pressing said pin against the periphery of said turret, and means for adjusting the tension of said spring.

8. A tamping tool comprising in combination a body portion, a shank at one end of said body portion for attaching said tool to a tool-holder, a casing of non-corrosive material surrounding the other end of said body portion and a projection at the end of said casing.

9. A tamping tool comprising a member formed with a shank at one end and a socket at the other, a tubular member detachably secured within said socket, a plunger adapted to reciprocate within said tubular member, a shoulder on the end of said plunger for retaining the same within said tubular member, a spring within said socket between the bottom of said socket and the end of said plunger, and a casing of non-corrosive material surrounding the other end of said plunger.

10. A mold of the character described, comprising a tubular casing formed with a funnel-shaped opening at one end thereof and a lining of non-corrosive material within said casing and extending over the walls of said opening.

In testimony whereof I affix my signature.

CARL HAMBUECHEN.